United States Patent [19]
Geier

[11] Patent Number: 5,752,220
[45] Date of Patent: May 12, 1998

[54] METHOD FOR HEADING ERROR SUPPRESSION IN DEAD RECKONING SYSTEMS

[75] Inventor: George J. Geier, Scottsdale, Ariz.

[73] Assignee: Motorola, Inc., Schaumburg, Ill.

[21] Appl. No.: 578,370

[22] Filed: Dec. 26, 1995

[51] Int. Cl.$^6$ .................................................... G01C 21/00
[52] U.S. Cl. .......................... 701/217; 701/224; 235/95 R
[58] Field of Search ...................................... 364/450, 457, 364/561, 571.01, 574; 235/95 R; 701/217, 224

[56] References Cited

U.S. PATENT DOCUMENTS

| | | | |
|---|---|---|---|
| 5,058,023 | 10/1991 | Kozikaro | 364/450 |
| 5,115,238 | 5/1992 | Shimizu et al. | 340/988 |
| 5,156,038 | 10/1992 | Kozikaro | 73/1 D |
| 5,278,424 | 1/1994 | Kagawa | 250/561 |

OTHER PUBLICATIONS

Mark S. Pikula and George Calvas, "Using Variable Reluctance Sensors for Differential Odometer Applications", Vehicle Navigation & Information Systems Conference Proceedings—Part I–Dearborn, MI–Oct. 20–23, 1991 —pp. 441–450.

*Primary Examiner*—Michael Zanelli
*Attorney, Agent, or Firm*—Bradley J. Botsch, Sr.

[57] ABSTRACT

A method for substantially reducing the error that accumulates in dead reckoning systems. The method includes determining heading changes from a dead reckoning system (10), testing for improbable heading changes (20), and setting to zero any invalid heading change (40). Testing for improbable heading changes (20) in differential odometry systems includes checking the sign of both prior (60) and next pulse count differences (70) and setting an invalid heading change flag (80) if either or both differ in sign. In systems using a heading rate sensor, testing for improbable heading changes (20) includes checking whether a heading change is below a minimum turn rate (90) and, if so, setting an invalid heading change flag (100).

16 Claims, 2 Drawing Sheets

METHOD FOR HEADING ERROR SUPPRESSION IN DEAD RECKONING SYSTEMS

FIELD OF THE INVENTION

The present invention relates in general dead reckoning systems, and in particular to a method for reducing heading error used for positioning a terrestrial vehicle.

BACKGROUND OF THE INVENTION

Accurate positioning of a terrestrial vehicle represents an essential element of autonomous navigation systems, vehicle tracking systems, and emergency messaging systems. In-vehicle navigation systems require accurate positioning to determine the current street location of the vehicle in order to provide reliable route guidance information to the driver. In tracking systems, where the position of the vehicle is provided to a centralized facility, accurate positioning improves the efficiency of operation of the system. In emergency messaging applications, the positioning accuracy and reliability affects life-saving services. In each application, momentary loss of positioning degrades the usefulness of the service. Use of a positioning source such as the Global Positioning System (GPS) by itself cannot provide continuous positioning in any of these applications, due to obscuration of the satellite signals by buildings and other structures in dense city environments. Use of a dead reckoning system to augment GPS can afford complete coverage; however, use of dead reckoning typically results in significant position error growth due principally to errors in the determination of heading.

Dead reckoning systems generally make use of methods for sensing the changes in heading and distance traveled of a terrestrial vehicle. Errors associated with the determination of heading changes can lead to significant positioning error accumulation. For example, a heading which is in error by only 5 degrees produces a position error growth which is roughly 10 percent of distance traveled; 10 meters of error would therefore result for every 100 meters of distance traveled. Current dead reckoning systems recognize this error growth, and depend upon periodic resets to an accurate position and heading, e.g., as can be provided by GPS. Such approaches suffer when GPS coverage conditions do not permit acquisition and track of at least three satellites with good geometry, however, and unacceptable levels of navigation error can result. In addition, GPS determined headings degrade significantly in accuracy at low vehicle speeds.

Thus, a method for reducing the heading error growth of the dead reckoning system is sought which will minimize position error accumulation.

DETAILED DESCRIPTION OF THE DRAWINGS

The present invention relates in general to a method for suppressing heading error accumulation in a dead reckoning system used for positioning a terrestrial vehicle. In particular, the present method identifies heading changes sensed in a dead reckoning system which are improbable vehicle heading changes, and removes their error contribution to the determination of heading. Removal of this heading error contribution substantially reduces the position error accumulation in the dead reckoning system.

The present methods solve the problem of heading and position error growth induced by erroneous heading changes sensed in a dead reckoning system. These heading changes can be induced by pulse noise in using differential wheel counts of a vehicle in a dead reckoning system based upon differential odometry, or heading rate sensor drift in a system utilizing a heading rate sensor. The dead reckoning system keeps track of the vehicle's heading by summing differential wheel counts or outputs of the heading rate sensor, so wheel count differences induced by pulse noise or heading rate sensor drift (and not by true heading changes) can lead to large navigation errors. The techniques described below permit isolation of the heading changes caused by noise and drift effects from the true heading changes of the vehicle, resulting in substantial error reduction.

Figure 1:
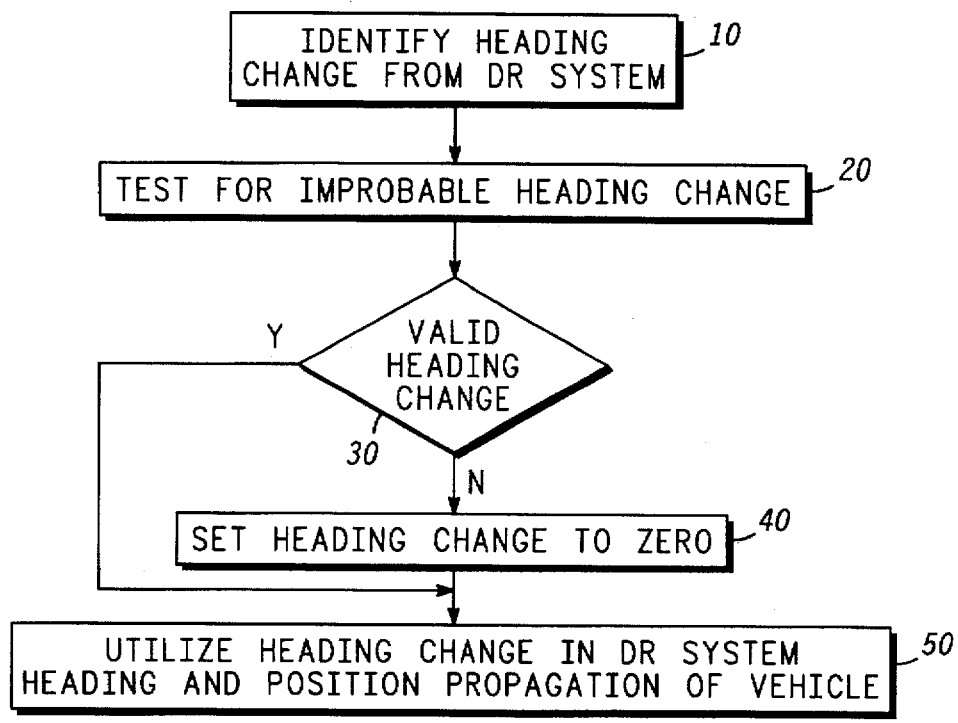
FIG. 1 is a flowchart that illustrates a method of heading error suppression in accordance with a preferred embodiment of the invention.

FIG. 1 illustrates the method. Step 10 in FIG. 1 illustrates identifying or determining heading change from the dead reckoning (DR) system. For a system which makes use of wheel sensors (e.g., as might be part of an Anti-lock Braking System or ABS), pulse counts proportional to the rotation of laterally opposed vehicle wheels are subtracted and divided by the distance between the wheels, or wheel track. (The difference in distance traveled by the laterally opposed wheels while turning is equal to the angular heading change of the vehicle times the difference in turn radii between the laterally opposed wheels (i.e. the wheel track). Thus, the heading change is equal to the difference in distance traveled divided by the wheel track.) In a heading rate sensor based system, step 10 in FIG. 1 is determined directly by a heading rate sensor.

Figure 4:
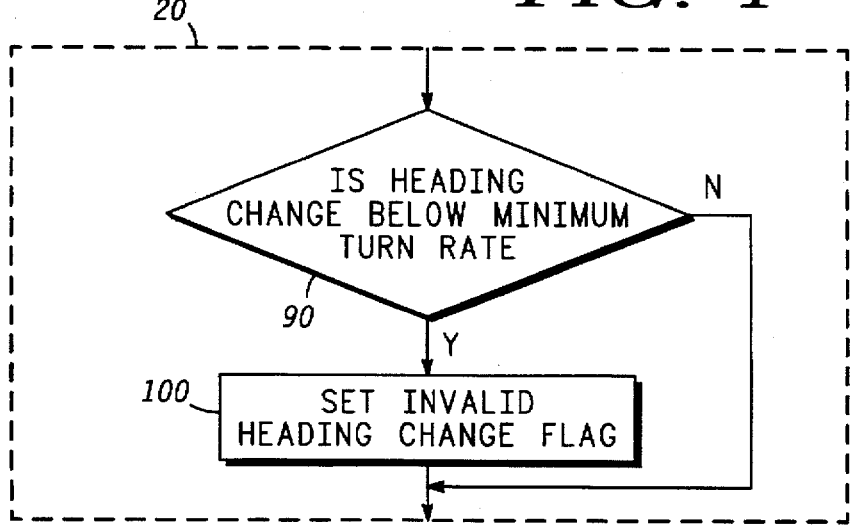
FIG. 4 is a flowchart that illustrates another preferred embodiment to test for improbable heading changes in a dead reckoning system based upon a heading rate sensor.

Following determination of the heading change in FIG. 1 (step 10), a test is made for an improbable heading change (step 20), e.g., as could be induced by noise in the wheel sensors, or drift in the heading rate sensor. The specific tests are illustrated in FIGS. 2 and 4, respectively, for a differential odometry system and a heading rate sensor system and are described in more detail below.

If a purported heading change is determined to be improbable in decision step 30 in FIG. 1 as a result of test step 20, the heading change is reset to zero (step 40). The zero heading change, or a valid heading change (if the heading change is not found to be improbable in step 30) is then used to update the vehicle's heading and position propagation forward in time (step 50 in FIG. 1).

Figure 2:
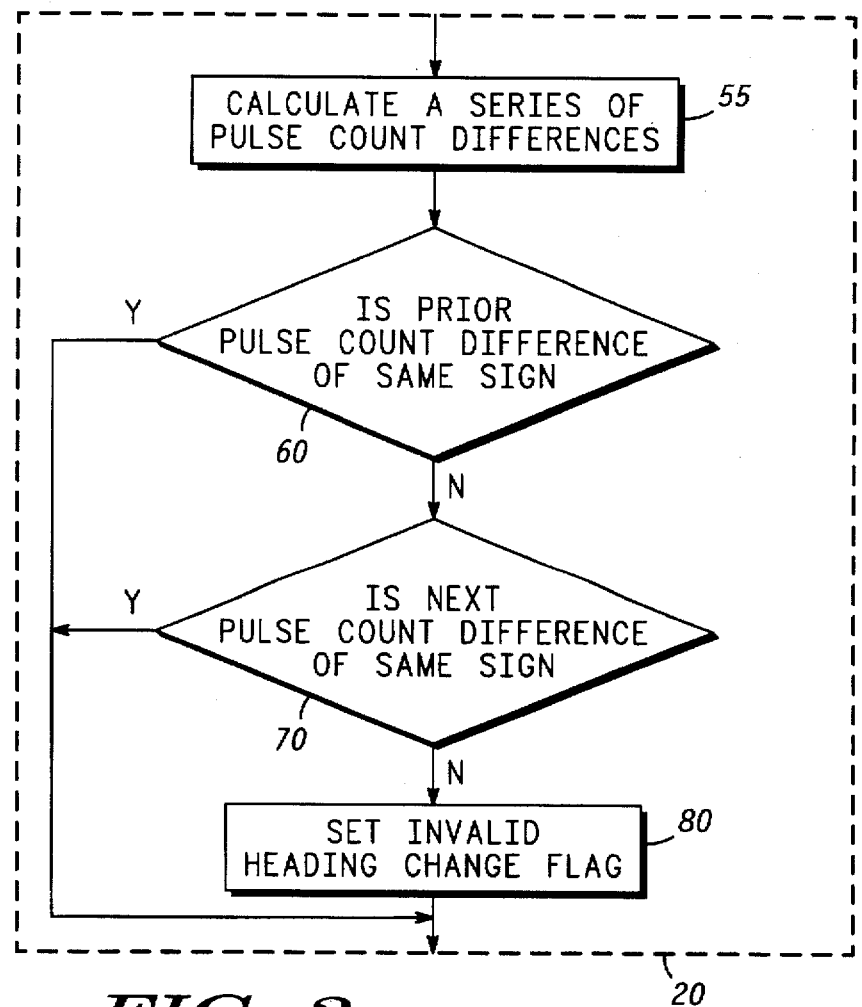
FIG. 2 is a flowchart that illustrates a preferred embodiment to test for improbable heading changes in a dead reckoning system based upon differential odometry.

An improbable heading test for a differential odometry based dead reckoning system is illustrated in FIG. 2. A series of pulse count differences is calculated from pulse counts of laterally opposed wheels on the vehicle (step 55). The improbable heading test examines the sign of a prior pulse count (step 60) and the sign of a next pulse count (step 70) in the series of pulse count differences arising from the wheel sensor data. If both signs differ from the sign of a current pulse count difference, then the current heading change (as determined for the current pulse count) is considered improbable, and a flag is set to indicate that the current heading change is invalid (step 80). If the sign of either the prior pulse count difference or the next pulse difference is the same as the sign of the current pulse count difference, the current heading change is considered valid.

The above described methods for reducing the effects of pulse noise are based on the expected magnitude and frequency content of heading changes such as occur in an "urban canyon" when an integrated navigation system is more likely to rely upon differential odometry to track a vehicle's heading changes. Since real vehicle heading changes are generally quite large and occur over a period of several seconds, corresponding to lane changes or turns, heading changes induced strictly by noise can be culled and invalidated. For example, a typical vehicle turn occurs in three to five (3–5) seconds, with a rate of turn of ten to thirty (10–30) degrees per second. Any heading change that corresponds to single or multiple pulse counts and is not followed or preceded by one or more pulses of the same sign is thus caused by noise, and is therefore not a true heading change.

Given the above definition of noise induced heading change, the following heading changes (listed as the second value in each sequence) are considered invalid and thus will be ignored in the present error suppression system and method (in each case, the second pulse in each sequence will be set to zero, as indicated below, prior to its use in heading and position propagation):

Possible Noise-Induced Pulse Counts $(0, N, 0) \rightarrow (0, 0, 0)$ $(0, -N, 0) \rightarrow (0, 0, 0)$ $(0, M, -N) \rightarrow (0, 0, -N)$ $(0, -M, N) \rightarrow (0, 0, N)$ $(N, -M, 0) \rightarrow (N, 0, 0)$ $(-N, M, 0) \rightarrow (-N, 0, 0)$ where M and N are arbitrary positive integers.

A method in accordance with the method illustrated in FIGS. 1 and 2 has been demonstrated to be effective in suppressing heading and position error accumulation induced by pulse noise. Assuming successive heading increments due to pulse noise are statistically uncorrelated, quantization error without pulse noise suppression will produce a heading error growth proportional to the square root of the travel time, with the constant of proportionality equal to the standard deviation associated with the pulse quantization.

The above can be applied to tests using the methods illustrated in FIGS. 1 and 2 that were conducted in downtown Chicago using a Motorola Intelligent Vehicle Highway System (IVHS) test vehicle. For the data displayed in FIG. 3, the pulse quantization is 4.2 centimeters, and the wheel track is 1.5 meters. The standard deviation associated with the heading error (assuming a uniform probability density function for the pulse noise error equal to 1 pulse) is 0.93 degrees, which integrates to an uncorrected heading error standard deviation of 9.3 degrees in 100 seconds of propagation without external (e.g., GPS) updates. Such a 9.3 degree heading error scales to 16% of distance traveled position error growth, which is unacceptable for most applications.

To examine the effectiveness of the presently described methods of error suppression, the previously referenced collected test data show vehicle dead reckoning position and heading determination both with and without noise suppression. The results are plotted in FIG. 3. The values for M and N were set to 1 in generating these results, since the pulse noise level was expected to generally be less than a single pulse. The vertical and horizontal scales of the plot are latitude and longitude, respectively, in radians (each division on the plot corresponds to roughly 100 meters). The trajectory corresponds to a closed street path, with the final turn corresponding to a southerly heading along the same road on which the vehicle started traveling north. Thus, a closure error can be measured as the distance from the start of the trajectory to the start of the final turn.

Figure 3:
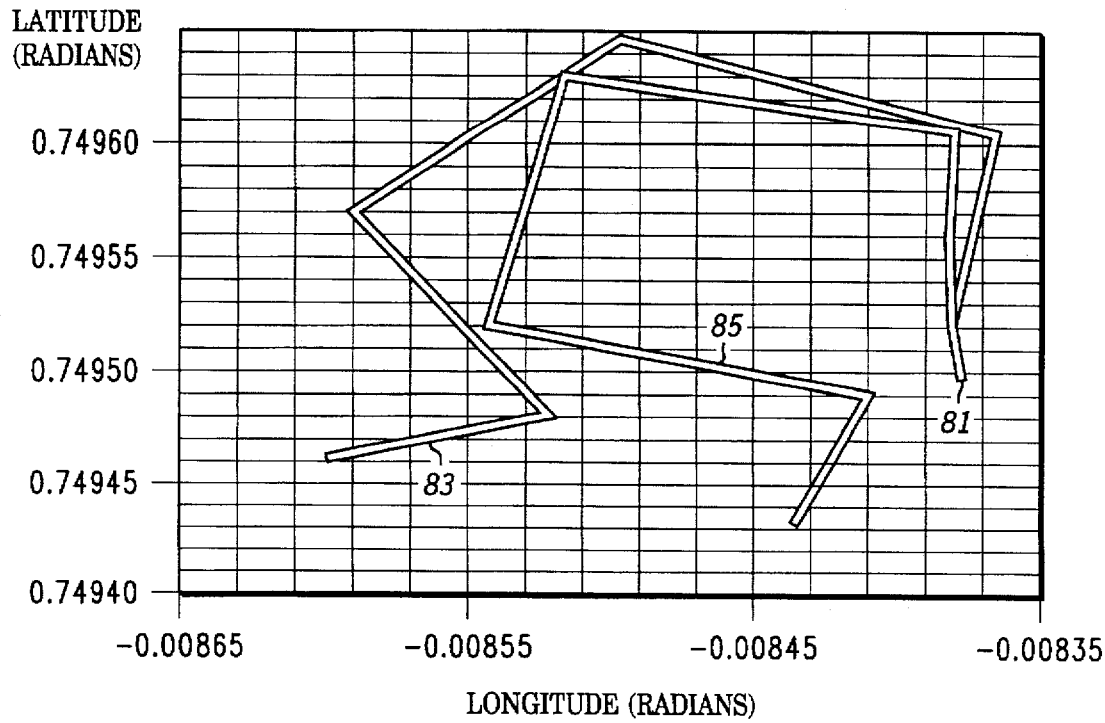
FIG. 3 is a plot illustrating the effectiveness of the heading error suppression method described in FIGS. 1 and 2.

The FIG. 3 closure error in the uncorrected case (no error suppression) is about 700 meters over the 2.7 kilometers traveled, representing 25.9% of the DR system. The FIG. 3 closure error in the corrected case (with error suppression as described herein) is about 160 meters over the 2.7 km traveled, representing 5.9% of the DR system. Over the duration of the test (796 seconds), the uncorrelated noise model for quantization error predicts that 26.2 degrees of heading error (one-sigma) will accumulate, which scales to more than 44% of distance traveled error. The uncompensated error performance, as determined by the closure error, is therefore consistent with the model.

The persistent clockwise heading drift shown in FIG. 3 for both trajectories is probably partially due to differential tire pressure, which (at low speed) can also be compensated as pulse noise. The only potential for decreasing the accuracy of the computed trajectory occurs for very slow turns which can produce heading changes over an extended period of time. The heading rate change for such a turn would have to be less than a rate of one pulse each second, or 1.6 degrees per second, however. The persistence of such rates is very rare, and should only occur on major thoroughfares, when the reliance upon differential odometry (in an integrated navigation system) will be minimum.

An improbable heading test for a heading rate sensor based dead reckoning system is illustrated in FIG. 4. The heading change is tested against a level which corresponds to the lowest expected turn rate of the vehicle in step 90. If this minimum turn rate is not exceeded, an invalid heading change flag is set in step 100 and the heading change is not used to change the DR system heading and position propagation (in step 50 of FIG. 1).

Thus, a method for heading error suppression in dead reckoning systems has been described that overcomes specific problems and accomplishes certain advantages over prior art methods. The improvements over known technology are significant. The methods described reduce heading error in dead reckoning systems with important applications in navigation systems, vehicle tracking systems, and emergency messaging systems. The methods described identify and remove heading changes which are improbable vehicle heading changes. Removal of such heading errors contribution substantially reduces the position error accumulation in the dead reckoning system.

While a preferred embodiment of the present invention is described, it is contemplated that various modifications, alternatives and variations may be made thereto without departing from the spirit and scope of the present invention. Accordingly, it is intended that the invention embrace all such modifications, alternatives, and variations as fall within the spirit and scope of the claims hereinafter provided.

What is claimed is:

1. A method for suppressing heading error accumulation in a dead reckoning (DR) system, the method comprising the steps of:

identifying a heading change sensed by the dead reckoning system;

determining if the heading change is an improbable heading change including the substep of comparing the heading change to a minimum turn rate;

zeroing the improbable heading change if the heading change is an improbable heading change; and using the heading change to update a DR system heading for a vehicle.

2. A method as claimed in claim 1, wherein the steps of identifying, determining, zeroing, and using are repeated to maintain the DR system heading for the vehicle.

3. A method as claimed in claim 1, wherein the step of using includes the step of using the heading change to update a position of the vehicle.

4. A method as claimed in claim 1, wherein the step of determining further comprises the step of setting an invalid heading change flag if the heading change is below the minimum turn rate.

5. A method as claimed in claim 1, wherein the step of determining comprises the step of calculating a series of pulse count differences from pulse counts of laterally opposed wheels on the vehicle.

6. A method as claimed in claim 5, wherein the step of determining further comprises the step of comparing a sign of a prior pulse count difference of the series of pulse count differences to a sign of a current pulse count difference of the series of pulse count differences.

7. A method as claimed in claim 6, wherein the step of determining further comprises the step of comparing a sign of a next pulse count difference of the series of pulse count differences to the sign of the current pulse count difference of the series of pulse count differences.

8. A method as claimed in claim 7, wherein the step of determining further comprises the step of setting an invalid heading change flag if neither the sign of the previous pulse count difference or the sign of the next pulse count difference are identical to the sign of the current pulse count difference.

9. A method for suppressing heading error accumulation in a differential odometry-based dead reckoning (DR) system, the method comprising the steps of:

identifying heading changes sensed by the differential odometry-based system that are induced by pulse noise; and zeroing the heading changes on a DR system heading of a vehicle.

10. A method as claimed in claim 9, wherein the steps of identifying and zeroing are repeated to maintain the DR system heading for the vehicle.

11. A method as claimed in claim 9, additionally comprising the step of using the heading changes in position propagation of the vehicle.

12. A method as claimed in claim 11, wherein the steps of identifying heading changes, zeroing the heading changes on a DR system heading, and using the heading changes in position propagation are repeated to maintain the DR system heading for the vehicle.

13. A method for suppressing heading error accumulation in a dead reckoning (DR) system including a heading rate sensor, the method comprising the steps of:

identifying heading changes sensed by the heading rate sensor that are improbable heading changes; and zeroing the improbable heading changes on a DR system heading of a vehicle.

14. A method as claimed in claim 13, wherein the steps of identifying and zeroing are repeated to maintain the DR system heading for the vehicle.

15. A method as claimed in claim 13, additionally comprising the step of using the heading changes in position propagation of the vehicle.

16. A method as claimed in claim 15, wherein the steps of identifying heading changes, zeroing the heading changes on a DR system heading, and using the heading changes in position propagation are repeated to maintain the DR system heading for the vehicle.

* * * * *